May 7, 1963   L. V. BALDWIN   3,088,995
ELECTRICAL CABLE
Filed Jan. 28, 1960

INVENTOR
LOUIS VINCENT BALDWIN

BY *C. Ralph Snyder*

ATTORNEY 3,088,995
ELECTRICAL CABLE
Louis Vincent Baldwin, Newark, Del., assignor to E. I. du Pont de Nemours and Company, Wilmington, Del., a corporation of Delaware
Filed Jan. 28, 1960, Ser. No. 5,295
5 Claims. (Cl. 174—127)

This invention relates to insulated electrical conductors, and more particularly to insulated electrical cables designed to operate at voltages in excess of 600 volts.

Electrical cables designed to operate at voltages above 600 volts are usually of two types. The first type, presently useful at up to perhaps 15,000 volts, consists of a solid extruded insulation of rubber or of a plastic dielectric material, such as polyethylene, around the conductor. At higher voltages it becomes exceedingly difficult to construct a workable cable of this sort because of ionization troubles or corona, as it is commonly called. That is, air voids at the conductor face ionize, and the insulation, literally eaten away by this corona, eventually fails. Devices such as conducting or semi-conducting tapes wrapped around the conductor may reduce this tendency by reducing the chance of stressed air voids at this spot, but then it is found that it is extremely difficult to produce such a solid insulation that is completely free of small voids or bubbles within itself, and at high unit voltage stresses necessary for economical construction, ionization takes place in these bubbles and failure results. If the total thickness of insulation is increased to reduce the stresses below ionization levels, the construction is not economical. Corona-threshold levels of solid insulation do not increase at a rate equal to the increase in total insulation thickness. For any given insulation material exhibiting a given corona-threshold level at an insulation thickness of say 1X, a 10X thickness does not have 10 times the corona-threshold of the 1X section. For example, a ¼ mil layer of polyethylene terephthalate exhibits a corona-threshold of about 250 volts, whereas a 10 mil layer exhibits a corona-threshold of about 1000 volts which is only about a fourfold increase in corona-threshold for a fortyfold increase in thickness. Thus, higher operating voltages require increasingly exorbitant, unmanageable and expensive thicknesses of solid insulation to insure that any voids which may exist about or in the insulation will not be ionized.

At voltages above 15,000 a second type of cable is employed. This type consists of a porous material, such as paper, impregnated with a suitable dielectric liquid, such as oil, wrapped in layers around the conductor. The oil is depended upon to produce a void-free insulation so that corona from this source is no longer a serious threat and operating voltages are limited only by the breakdown or ionization levels of the oil itself. Devices such as gas under pressure or oil under pressure, in a surrounding "pipe," are sometimes used to insure the presence of oil and, thus, the proper suppression of corona. Obviously, the oil-filled system, although efficient, is subject to serious drawbacks in manufacture and during operation. In manufacture or installation the impregnation must be 100% complete and this involves many obvious difficulties. In operation an oil leak or gas leak in a gas-pressurized system could be fatal. If part of the oil-filled cable is installed in a vertical position, the oil impregnant tends to run back due to the force of gravity. This action leaves voids which are susceptible to corona and eventual breakdown of the cable insulation. In the case of a non-pressurized system the development of a "dry spot" through thermal expansion and contraction, or otherwise, could be equally fatal. The dry solid insulation first described is not subject to these ills but is limited by the corona-formation tendencies discussed in connection with it.

It is an object of our invention, therefore, to provide a dry - insulated, corona breakdown - resistant electrical cable suitable for high voltage application. Another object is to provide an electrical cable having dry insulation of greatly improved performance in terms of allowable working stresses in volts/mil. These and other objects will more clearly appear from the following description.

The foregoing and related objects are realized by the present invention which, briefly stated, comprises an electrical conductor, and, as insulation therefor, a plurality of layers of a dielectric organic polymeric film, each layer of film having adhered on one surface thereof a thin electrically conductive continuous metallic film, the metallic film of the layer of dielectric film nearest the conductor being in contact with said conductor, and the metallic film of each layer of dielectric film being out of electrical contact with the metallic film of every other layer of dielectric film.

Figure 1:
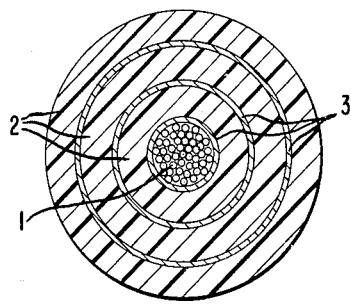
FIG. 1 is a radial cross-sectional view of an electrical cable constructed in accordance with this invention.
Figure 2:
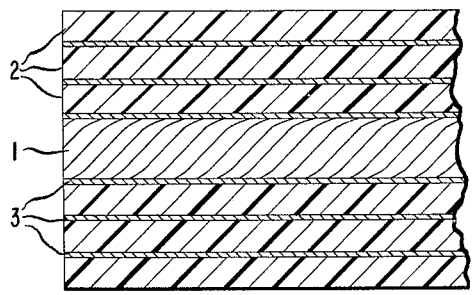
FIG. 2 is a horizontal cross-sectional view of the same cable.

Referring to the drawing, an electrical conductor 1 which may be solid, hollow, cored, or made up of a plurality of strands (as shown), and which may be of any desired cross-section, is covered with a plurality of layers of dielectric material each comprising essentially a thin film 2 of organic polymeric dielectric material, e.g., polyethylene terephthalate, coated on one side only with a thin coating 3 of metal, e.g., aluminum. The metallic coating of the innermost (i.e., bottom) layer of insulation is in contact with the conductor and thus becomes part of the conductor, and since, by reason of modern film metallizing techniques there is obtainable metal coated film substantially free of voids between the dielectric film and its coating, the existence of voids, which might give rise to ionization and resulting corona between the conductor and the adjacent insulating layer, is substantially eliminated. The subsequent layers of insulation are similarly disposed about the conductor.

In the cable construction of the present invention each layer of dry insulation is separated from the next layer by a metallic conducting layer "floating" electrically in the system, that is, not connected electrically to any other metallic layer or any conducting body. Hence, each layer of insulation becomes, in essence, a capacitor in series with all the other layers and of approximately the same capacitance as all the others. It is a known fact that a group of capacitors of equal capacitance, connected in series, will divide a total voltage impressed on the group equally among themselves. For example, if a 10 mil thickness of insulation is made up of 10 one mil layers, each separated from the next by a "floating" metallic conducting layer, and an electrical potential of 1000 volts is applied, the voltage across each layer is necessarily only about 100 volts. More specifically, if a layer thickness of ¼ mil polyethylene terephthalate film, the thinnest commercially available film in this material, is selected, approximately 250 volts are required across this thickness to produce corona. If, then, an approximately 10 mil thickness of insulation is made up of ¼ mil layers, each separated from the next by a metallic conducting layer, a total of 40 "capacitor" layers will exist, each capable of carrying 250 volts, before corona can start in it, and since the total voltage will divide equally among the layers, a total voltage of 40×250 or 10,000 volts can be applied across the 10 mils of insulation before corona can exist.

Because of its recognized outstanding electrical and mechanical characteristics polyethylene terephthalate film is preferred for purposes of this invention. It is obvious, however, that any organic polymeric dielectric film may be employed. Typical examples of such films, useful herein, are films of polyethylene, polypropylene, polystyrene, polyvinyl chloride, vinylidene chloride copolymers, polyamides, etc.

The film may be provided with one metallic surface by any known suitable technique. Metal coatings applied to the film by commercial vacuum metal coating methods are preferred for the reason that smooth, homogeneous, continuous (unbroken) coatings of metal are obtainable with a minimum of metal, and a minimum of coating faults. However, any conductive metal capable of being formed into a flexible, continuous thin film, such as aluminum, copper may be employed. Aluminum coatings as thin as 0.000001 of an inch have been found satisfactory. There is no critical maximum thickness for the metallic coating or layer since increasing the thickness has very little effect in preventing the start of corona.

In the preferred embodiment of this invention, layers of oriented polyethylene terephthalate film which has been metallized on one side with aluminum, are wrapped around a conductor until the desired amount of corona-free insulation has been obtained for the maximum voltage capacity desired. The metallized side of the first layer of film is in direct contact with the conductor. The layer-wrapped conductor is then overwrapped in the usual manner with the usual final protective wrap materials such as lead, impregnated fabric, etc.

The following specific examples further illustrate the principles and practice of this invention.

Example 1

A rectangular aluminum bar ¾" x 1.5" was wrapped in 18 layers of ⅓ mil polyethylene terephthalate film which had been metallized with aluminum on one surface by vaporization. The aluminum coating was approximately 0.0000015" thick. The metallized surface of the first layer was placed next to the aluminum bar. Using a corona-detection unit, the wrapped bar did not show corona until between 1700 and 1800 volts, or approximately 300 volts/mil, on the basis of the nominal 6 mils of "stratified" dielectric. An identical bar wrapped with 18 layers of plain ⅓ mil polyethylene terephthalate film showed corona starting at about 950 volts or approximately 160 volts/mil.

Example 2

A copper tube ⅝" in diameter was first wrapped with a layer of lead foil, the foil being 10 mils thick. This was to simulate random edges, pit holes and generally speaking, non-ideal electrode configuration. A total of 8 mils consisting of 32 layers of ¼ mil polyethylene terephthalate film metallized on one side with approximately 0.0000015" thick layer of aluminum was applied to the copper tube. For the outer electrode, a wrap of ¼ mil aluminum foil was first applied over the wrapped insulation and then a wrap of 5 mil foil to act as a terminal. Corona started at approximately 2600–2800 volts, or about 350 volts/mil. A voltage of 2400 volts R.M.S. or 300 volts per mil, was applied for 3600 hours without any failure.

I claim:

1. An electrical cable comprising an electrical conductor and surrounding said conductor a plurality of cylindrical layers of a dielectric organic polymeric film of substantially equal thickness, each layer of dielectric film having adhered on one surface thereof a complete covering of thin electrically conductive continuous metallic film, the metallic film of the layer of dielectric film nearest the conductor being in contact with said conductor, and the metallic film of each layer of dielectric film being separated from the metallic film of every other layer of dielectric film by the interposed layers of dielectric organic polymeric film.

2. The cable of claim 1 wherein the dielectric film is polyethylene terephthalate film.

3. An electrical cable comprising an electrical conductor and surrounding said conductor a plurality of cylindrical layers of a dielectric organic polymeric film of substantially equal thickness, each layer of dielectric film having on one surface thereof a complete covering of an adhered continuous coating, at least 0.000001 of an inch thick, of an inch thick, of an electrically conductive metal, the coating of dielectric film nearest the conductor being in contact with said conductor, and the coating of each layer of dielectric film being separated from the coating of every other layer of dielectric film by the interposed layers of dielectric organic polymeric film.

4. The cable of claim 3 wherein said dielectric film is polyethylene terephthalate.

5. The cable of claim 4 wherein said electrically conductive metal is aluminum.

References Cited in the file of this patent

UNITED STATES PATENTS

| | | |
|---|---|---|
| 1,610,980 | Siberman | Dec. 14, 1926 |
| 1,701,278 | Siberman | Feb. 5, 1929 |
| 1,702,993 | Brown | Feb. 19, 1929 |
| 1,958,281 | Scott | May 8, 1934 |
| 2,260,845 | Urmston | Oct. 28, 1941 |
| 2,286,052 | Beaver et al. | June 9, 1942 |
| 2,879,183 | Doherty et al. | Mar. 24, 1959 |

FOREIGN PATENTS

| | | |
|---|---|---|
| 21,860 | Great Britain | 1907 |
| 479,481 | Great Britain | Feb. 7, 1938 |
| 161,646 | Australia | June 25, 1953 |